(12) United States Patent
Chen et al.

(10) Patent No.: US 7,417,345 B2
(45) Date of Patent: Aug. 26, 2008

(54) FAN ASSEMBLY WITH MAGNETIC THRUST BEARINGS

(75) Inventors: Lee-Long Chen, Taoyuan Hsien (TW); Shih-Ming Huang, Taoyuan Hsien (TW); Sean Chang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 312 days.

(21) Appl. No.: 10/878,114

(22) Filed: Jun. 29, 2004

(65) Prior Publication Data

US 2005/0035670 A1 Feb. 17, 2005

(30) Foreign Application Priority Data

Aug. 15, 2003 (TW) .............................. 92122447 A (51) Int. Cl.
*H02K 7/09* (2006.01)

(52) U.S. Cl. ............ 310/90.5; 417/423.12; 310/156.04; 310/51; 310/90

(58) Field of Classification Search ................ 310/90.5, 310/90, 51, 156.04; 417/354, 423.1, 423.12
See application file for complete search history.

(56) References Cited

U.S. PATENT DOCUMENTS

| | | | | |
|---|---|---|---|---|
| 3,362,627 A | * | 1/1968 | Papst | 417/354 |
| 3,934,950 A | * | 1/1976 | Kuhlmann | 310/90.5 |
| 5,173,797 A | * | 12/1992 | Zedekar et al. | 359/212 |
| 5,204,567 A | * | 4/1993 | Kinoshita et al. | 310/90 |
| 5,561,335 A | * | 10/1996 | Dunfield et al. | 310/90.5 |
| 5,574,322 A | * | 11/1996 | Nii et al. | 310/90.5 |
| 5,587,617 A | * | 12/1996 | Dunfield et al. | 310/90.5 |
| 5,982,064 A | * | 11/1999 | Umeda et al. | 310/90 |
| 6,013,966 A | * | 1/2000 | Fehrenbacher et al. | 310/257 |
| 6,250,810 B1 | * | 6/2001 | Chang et al. | 384/428 |
| 6,265,798 B1 | * | 7/2001 | Huang et al. | 310/90.5 |
| 6,386,837 B2 | * | 5/2002 | Horng | 417/354 |
| 6,420,809 B1 | * | 7/2002 | Obara | 310/90 |
| 6,507,135 B1 | * | 1/2003 | Winkler | 310/91 |
| 6,617,730 B2 | * | 9/2003 | Horng et al. | 310/90 |
| 6,617,732 B1 | * | 9/2003 | Lin et al. | 310/90.5 |
| 6,773,239 B2 | * | 8/2004 | Huang et al. | 417/354 |

(Continued)

FOREIGN PATENT DOCUMENTS

GB 2335254 * 9/1999

(Continued)

*Primary Examiner*—Karl I Tamai
(74) *Attorney, Agent, or Firm*—Birch, Stewart, Kolasch & Birch, LLP (57) ABSTRACT

A motor. The motor includes a stator, a rotor, a top magnetic structure, and a bottom magnetic structure. The stator is disposed in a frame. The rotor is also disposed in the frame, corresponding to the stator. The rotor comprises a shaft, extended axially from the rotor. The shaft does not contact the stator or the frame. The bottom magnetic structure is at the bottom of the frame. The top magnetic structure is on the top of the frame. The top and bottom magnetic structures are opposite to each other in an axial direction. Magnetic attraction generated between the first magnetic structure and the second magnetic structure attracts and positions the shaft therebetween such that the first magnetic structure, the second magnetic structure, and the shaft are coaxially aligned.

29 Claims, 6 Drawing Sheets

U.S. PATENT DOCUMENTS

| | | | |
|---|---|---|---|
| 6,849,978 B2 * | 2/2005 | Sun et al. | 310/90.5 |
| 7,015,612 B2 * | 3/2006 | Fujinaka et al. | 310/90.5 |
| 7,023,119 B2 * | 4/2006 | Doemen | 310/90.5 |
| 2005/0035670 A1 * | 2/2005 | Chen et al. | 310/10 |

FOREIGN PATENT DOCUMENTS

| | | | |
|---|---|---|---|
| JP | 52095010 A | * | 8/1977 |
| JP | 07-250452 | * | 9/1995 |

* cited by examiner

FAN ASSEMBLY WITH MAGNETIC THRUST BEARINGS

This Nonprovisional application claims priority under 35 U.S.C. § 119 (a) on patent application Ser. No(s). 092122447 filed in TAIWAN on Aug. 15, 2003, the entire contents of which are hereby incorporated by reference.

BACKGROUND

1. Field of the Invention

The present invention relates to a motor, and in particular to a high power motor not utilizing bearings.

2. Description of the Related Art

A conventional motor comprises a shaft, a rotor, and a bearing. The rotor is disposed on the shaft and supported by the bearing, enabling the rotor to rotate smoothly.

Mechanical components reducing friction and bearing loads in rotary and linear drives include ball and roller bearings, sleeve bushings, dynamic bearings, magnetic bearings, and other configurations.

A ball bearing comprises an outer ring, an inner ring, and a plurality of metal balls disposed therebetween. The ball bearing is actuated by rolling of the metal balls. Only one contact point between the metal balls and the inner or outer ring allows easy acceleration of the motor. The structure of the ball bearing, however, is weak and susceptible to impact. In addition, when the motor with the ball bearing is operated, the balls roll at high speeds, resulting in producing high noise level. The structural interface between the balls and the inner and outer rings requires a high degree of accuracy, thus increasing manufacturing costs.

A sleeve bearing is formed by mixing and sintering bronze powder, iron powder, nickel powder, lead powder and other metal powders. Lubricant is applied into the pores of the bearing. The sleeve bearing, when disposed in a motor, is fastened in the central position of the stator. The shaft of the rotor is disposed in the bearing such that a gap is maintained between the bearing and the shaft. When the motor is operated, the lubricant exudes from the bearing such that the rotor rotates in the lubricant. This type of bearing can sustain higher impact than the ball bearing, and manufacturing costs are also reduced. In a motor utilizing the sleeve bearing, however, the lubricant evaporates into gaseous phase as the bearing is operated over long periods. As a result, the shaft directly contacts the bearing such that friction is produced therebetween. Furthermore, nitrides can possibly form at the ends of the bearing, causing damage and increasing noise level. In addition, dust in the air may be drawn into the center of the motor during operation, contaminating the lubricant surrounding the bearing, increasing noise level and occluding moving parts. Furthermore, since the gap between the bearing and the shaft is small, the efficiency in starting the motor is reduced.

A dynamic bearing is a variation of the sleeve bearing. This type of bearing comprises an inner wall with two annular arrays of V-shaped grooves formed therein. During operation, air and lubricant are impelled toward the pointed ends of the grooves forming two oil-gas cushions to support the shaft. In a motor with this type of bearing, the oil-gas cushion, formed at the pointed end of the V-shaped groove, is unable to be dispersed or evaporated. Formation of the groove on the inner side of the dynamic bearing, however, requires precise manufacturing. Furthermore, the gap between the shaft and the bearing must be accurately maintained. Thus, the manufacturing cost is higher than other types of bearings. Moreover, when the motor operates at low speed, the oil-gas cushion is not formed. Thus, the dynamic effect is not achieved at low speeds, such that performance of the dynamic bearing is substantially the same as a sleeve bearing.

A magnetic bearing has a plurality of N-S (north-south) magnetic poles formed on the shaft. The bearing corresponding to the shaft has the same N-S poles formed thereon. During operation, repellant force suspends the shaft in the bearing. Because there is no direct contact between the shaft and the bearing, neither noise nor friction is generated therebetween. The magnetic bearing, however, must be designed with a gap of about 0.2 mm between the shaft and the bearing, such that balanced force toward the center point is generated by each portion of the bearing surrounding the shaft. However, if the position of the shaft is offset by external force or driving force during operation, the imbalance can cause shaft contact with the bearing. This increases noise, shortens lifetime, and can even interrupt normal operation of the motor.

Furthermore, since the magnetic bearing is based on magnetic balance, there are occasions that the motor cannot be smoothly started. Thus, the magnetic bearing is still in an experimental stage, as yet unable to be mass produced.

SUMMARY

Accordingly, an object of the present invention is to provide a motor minimizing problems associated with bearings.

The present invention provides a motor comprising a stator, a rotor, a top magnetic structure, and a bottom magnetic structure. The stator and the rotor are disposed correspondingly in a frame. The rotor comprises a shaft, extending axially from the rotor. The shaft does not contact the stator or the frame. The bottom magnetic structure is disposed in the bottom of the frame. The top magnetic structure is disposed in the top of the frame. The magnetic structures are disposed opposite to each other in an axial direction. Magnetic attraction generated between the magnetic structures positions the shaft therebetween such that the first magnetic structure, the second magnetic structure, and the shaft are coaxially aligned.

According to the motor of the present invention, the shaft attracts or contacts the top magnetic structure, the bottom magnetic structure, or the magnetic structures. Furthermore, the motor comprises at least one wear-resistant structure, disposed between the shaft and the bottom magnetic structure, the shaft and the top magnetic structure, or the shaft, the top, and the bottom magnetic structures. The shaft contacts the wear-resistant structure at a contact point.

Accordingly, the motor further comprises a magnetic structure encircling the rotor, and a permeable structure encircling the stator and disposed corresponding to the magnetic structure encircling the rotor. The magnetic structure encircling the rotor comprises a magnetic central plane, positioned slightly higher or lower than, or level with the magnetic central plane of the permeable structure in an axial direction.

Furthermore, in the present invention, when the stator is covered by the rotor, the shaft extends through the central opening of the stator, and a protective structure is formed on a sidewall of the opening without directly contacting the shaft.

In addition, the end surface of the shaft is selected from the group consisting of flat, curved, pointed, concave, convex, and combinations thereof, as is the end portion of the top or bottom magnetic structure facing the end surface of the shaft correspondingly. Moreover, the shape of an end of the wear-resistant structure facing the axle shaft also corresponds to that of the shaft point.

In the motor of the invention, a plurality of blades surround the periphery of the rotor. The blades are centrifugal, planar, or axial. The frame comprises an upper cover and a lower cover, connected by fitting, engaging, gluing, locking, connecting via a cushion device, or combinations thereof and corresponding to each other.

Accordingly, the upper and lower magnetic structures and the shaft are coaxial.

The present invention also provides a motor, applicable in a fan assembly, comprising a stator, a rotor, a plurality of blades, and at least one magnetic structure. The stator is disposed on a base comprising at least one permeable structure. The rotor comprises a shaft. The shaft extends axially from the rotor. The magnetic structure encircles the rotor, corresponding to the permeable structure. The blades surround the periphery of the rotor, and the magnetic structure is fastened on the base via magnetic attraction to position the shaft. The magnetic structure contacts the shaft at a contact point. The magnetic central plane of the rotor is positioned substantially higher than the magnetic central plane of the stator.

As a result, the rotor shaft contacts the stator at a contact point. During operation, buoyant force or lifting force is generated by airflow without making direct contact, thereby greatly reducing noise from the motor and increasing the lifetime.

Moreover, the motor of the present invention is operated via magnetic attraction of the shaft and buoyant force is generated during rotation by airflow, and thus, noise from the motor is reduced and lifetime is increased. The motor with a conventional bearing is replaced by the motor of the invention to eliminate components and reduce assembly costs thus minimizing manufacturing cost.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
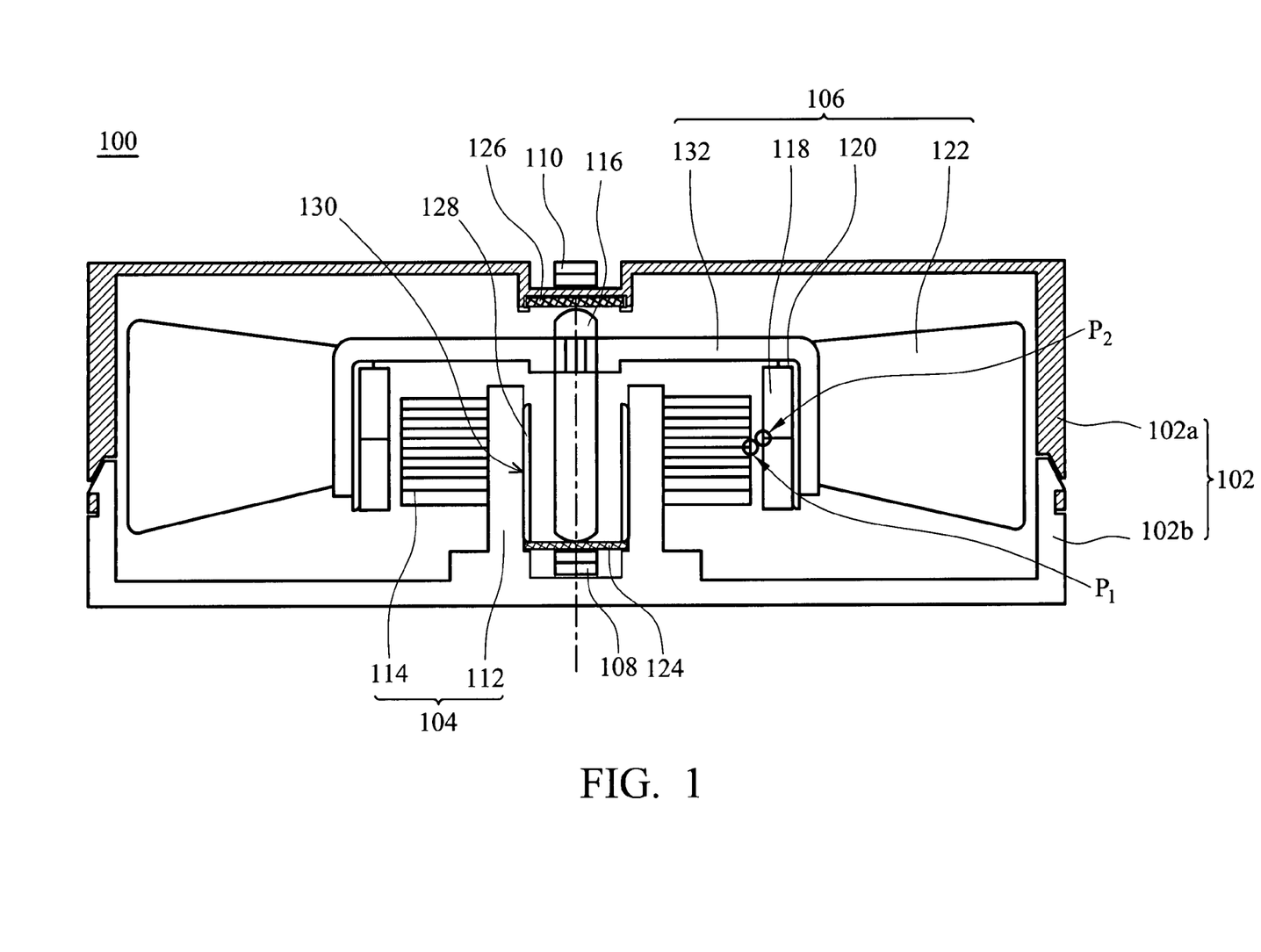
FIG. 1 is a schematic diagram of a motor according to a first embodiment of the present invention.

FIG. 1 is a schematic diagram of a motor according to a first embodiment of the present invention. The motor 100 comprises a frame 102, a stator 104, a rotor 106, and magnetic structures 108 and 110. A shaft 116 extends axially from the rotor 106. The shaft 116 and the magnetic structures 108 and 110 are aligned coaxially. In the motor 100, the magnetic attraction is generated between the magnetic structures 108 and 110 and the shaft 116.

The frame 102 protects the motor 100 and internal elements thereof from external force. The frame 102 is either integrally formed or comprises an upper and a lower cover 102a and 102b. The frame 102 may also be formed by a plurality of divided portions (not shown). The covers 102a and 120b are connected by fitting, engaging, gluing, locking, or connecting via a cushion device. Furthermore, the upper and lower covers 102a and 102b are correspondingly engaged, for example, engaged by a hook, as shown in FIG. 1.

The stator 104 is disposed in the frame 102 to produce induced current or provide driving force for the rotor 106. The stator 104 comprises a printed circuit board (not shown), a stator fixing base 112, and at least a permeable structure 114. The stator 104 does not contact the shaft 116 described later. The permeable structure 114 surrounds the base 112 and comprises a magnetic central plane P1. The permeable structure 114 can be a silicon steel plate or an electromagnet.

The rotor 106 is movably disposed in the frame 102, corresponding to the stator 104. The rotor 106 comprises the shaft 116, rotor 132, at least one magnetic structure 118, a permeable cover 120. The shaft 116 comprises a flat, curved, pointed, concave, or convex end surface.

The magnetic structure 118 comprises a magnetic central plane P2. The magnetic structure 118 corresponds to the permeable structure 114. The magnetic central plane P1 is positioned higher, level with, or lower than the magnetic central plane P2 in the axial direction of the shaft. The magnetic structure 118 is a permanent magnet or a plastic magnet.

In addition, the rotor 106 further comprises a plurality of blades for producing airflow around the motor 100 during rotation of the rotor 106. The type of the blades 122 can be centrifugal, planar, or axial.

The magnetic structures 108 and 110 are disposed on the bottom and the top of the frame 102, respectively, corresponding to a respective end of the shaft. The magnetic structures 108 and 110 are permanent magnets, plastic magnets, or electromagnets. The two structures 108 and 110 can be connected and fastened on the frame 102 by gluing, fitting, engaging, or contacting. The surfaces of the magnetic structures 108 and 110 facing each other have opposite polarities therebetween. The surface of the magnetic structures 108 and 110 facing the shaft 116 and the end surface of the shaft 116 are curved, where the magnetic structures 108 and 110 contact the shaft 116 at a contact point. The surface shape can be flat, curved, pointed, concave, or convex.

The magnetic structures 108 and 110 and the shaft 116 are coaxially maintained by the magnetic attraction therebetween such that the shaft 116 is positioned between the magnetic structures 108 and 110. When the motor 100 is idle, the shaft 116 also can only contact the magnetic structure 108 at a contact point, without contacting other elements.

Furthermore, the shaft 116 also may only contact the other magnetic structure 110 at a contact point such that the rotor 106 is suspended in the frame 102.

Moreover, the shaft 116 can also contact the magnetic structures 108 and 110 at a contact point simultaneously.

To further increase the lifetime of the motor 100, wear-resistant structures 124 and 126 may be additionally disposed between the shaft 116 and the magnetic structures 108 and 110. In this case, the shaft 116 only contacts the wear-resistant structures 124 and/or 126 at a contact point. The wear-resistant structures 124 and 126 are fixed onto the magnetic structures 108 and 110 respectively. The wear-resistant structures 124 and 126 can be formed on the magnetic structures 108 and 110 simultaneously or at the intersection between the shaft 116 and the magnetic structures. Put simply, the wear-resistant structure 124 is formed on the magnetic structure 108, and the wear-resistant structure 126 is formed on the magnetic structure 110. The wear-resistant structures 124 and 126 are formed thereon by gluing, engaging, fitting, contacting, or combinations thereof. The wear-resistant structures 124 and 126 can either directly contact or not contact the magnetic structures 108 and/or 110 and are coaxially aligned with the magnetic structures 108 and 110.

Furthermore, to prevent damage on the motor 100 due to impact between the shaft 116 and the stator fixing base 112 during transport, a protective structure 128 can be disposed on an opening 130 at an inner side of the stator fixing base 112. The protective structure 128 does not contact the shaft 116. The material of the protective structure 128 can be selected from the group consisting of plastic, flexible material, vibration absorbing material, and combinations thereof.

Figure 2:
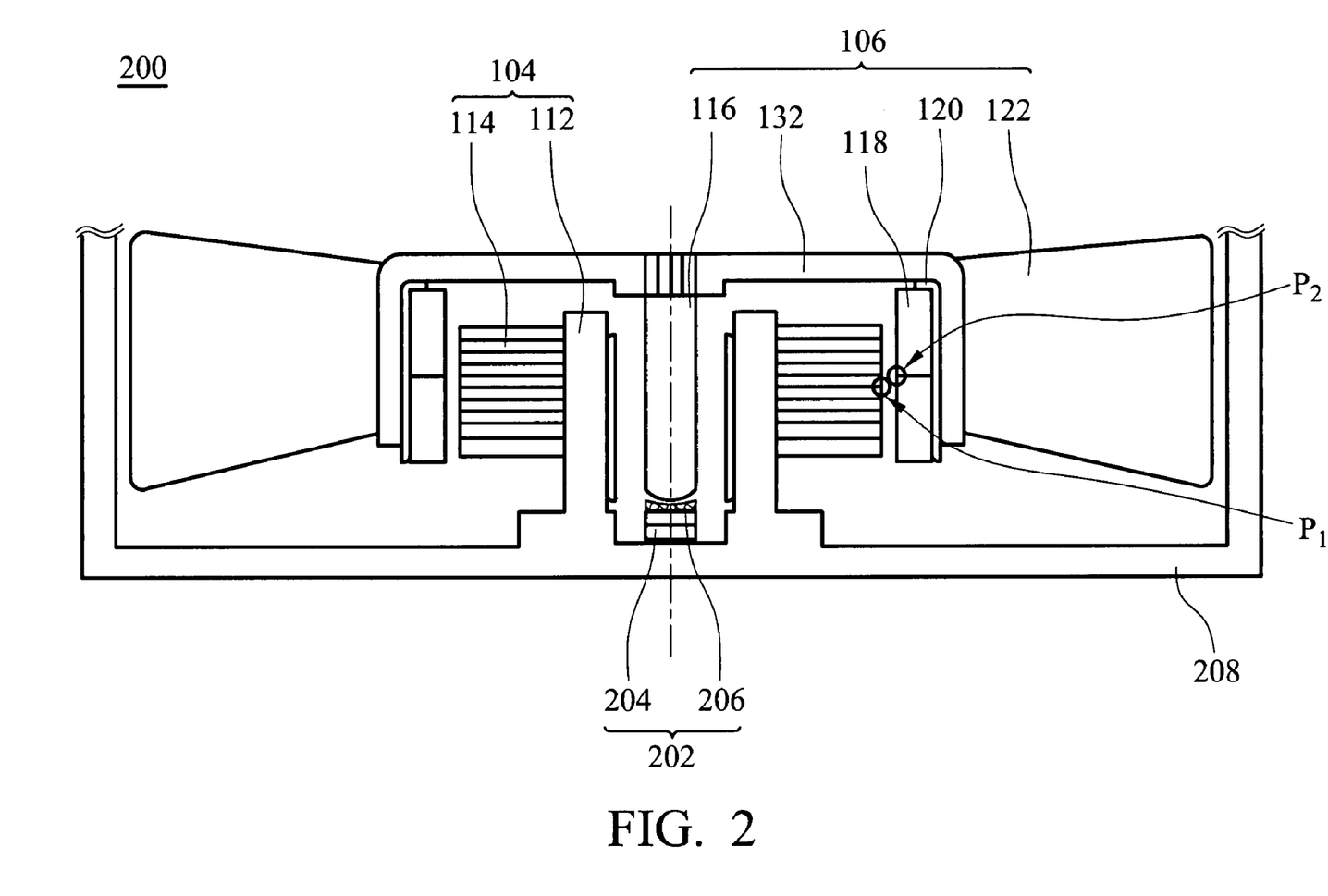
FIG. 2 is a schematic diagram of a motor according to a second embodiment of the present invention.

FIG. 2 is a schematic diagram of a motor 200 according to a second embodiment of the present invention, from which elements common to the first embodiment are omitted. The difference is that only one magnetic structure 202 is used to attract the shaft 116 of the rotor 106. The magnetic central plane P2 of the magnetic structure 118 is higher than the magnetic central plane P1 of the permeable structure 114 in an axial direction with respect to a base 208.

In this embodiment, the magnetic structure 202 is entirely made of a magnetic material, or formed by a wear-resistant structure 206 and a magnetic body 204. Moreover, the surface between the magnetic structure 202 and the shaft 116 or the surface between the wear-resistant structure 206 and the shaft 116 is curved with a contact point therebetween. The surface of the magnetic structure 202 and/or the wear-resistant structure 206 is curved, pointed, concave, convex, or combinations thereof. The relationship between the shaft 116 and the magnetic structure 202 is the same as the above description.

Figure 3A:
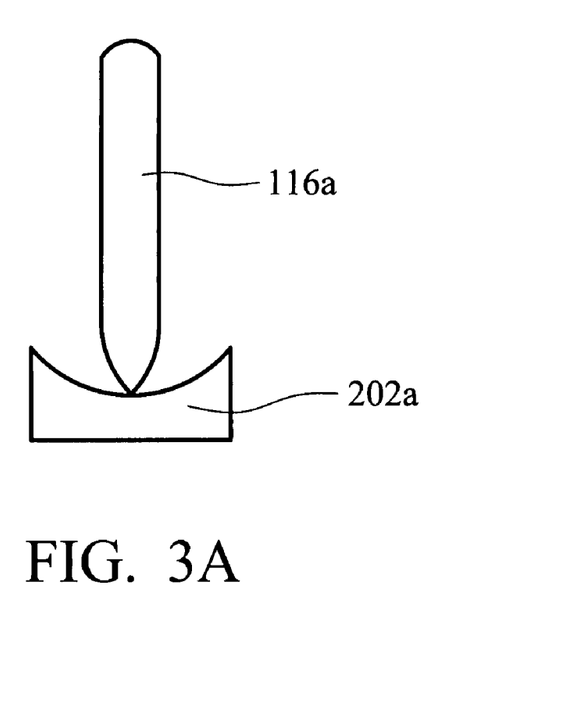
FIGS. 3A to 3D are local enlarged schematic diagrams of a shaft of the motor according to the present invention.
Figure 3B:
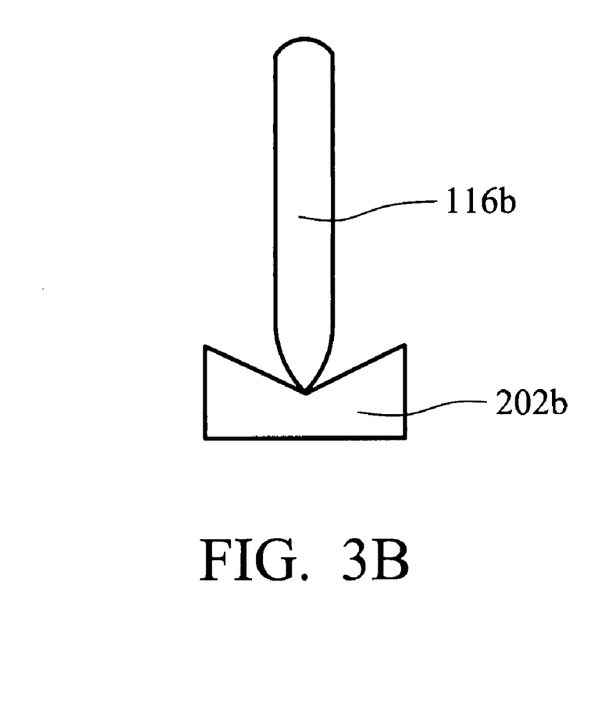

When an end of a shaft 116a or 116b has a pointed shape, the surface of the magnetic structure 202a or 202b is curved or shaped in concave corresponding to the end of the shaft 116a or 116b as shown in FIGS. 3A or 3B.

Figure 3C:
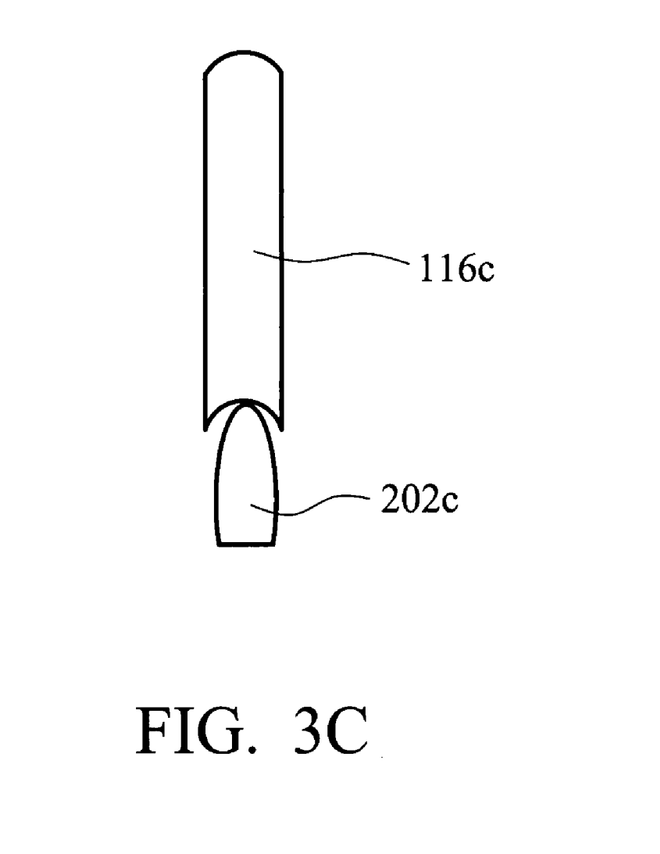
Figure 3D:
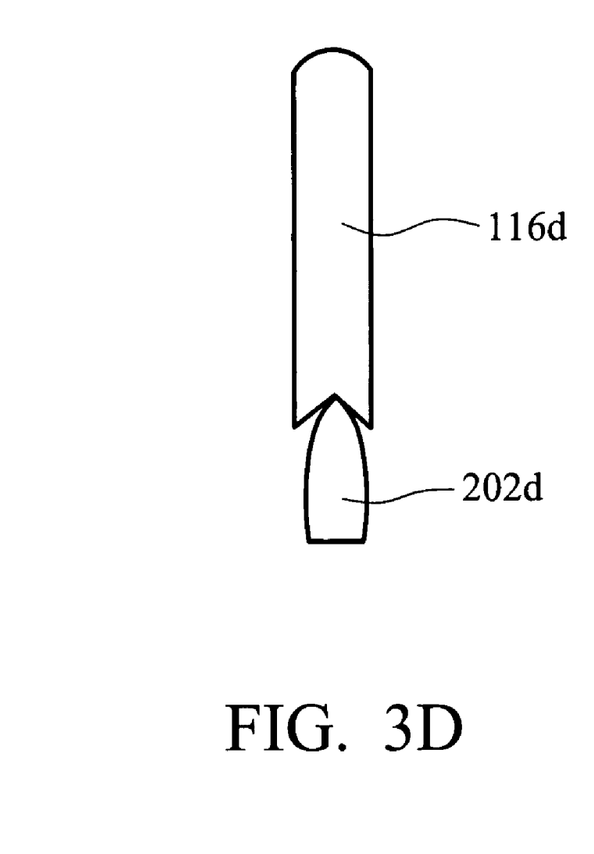

Furthermore, as shown in FIG. 3C, a curved end of a shaft 116c is corresponding to a convex end of the protruding magnetic structure 202c. Similarly, as shown in FIG. 3D, the shaft 116d has a differently shaped depression corresponding to the pointed magnetic structure 202d.

Figure 4:
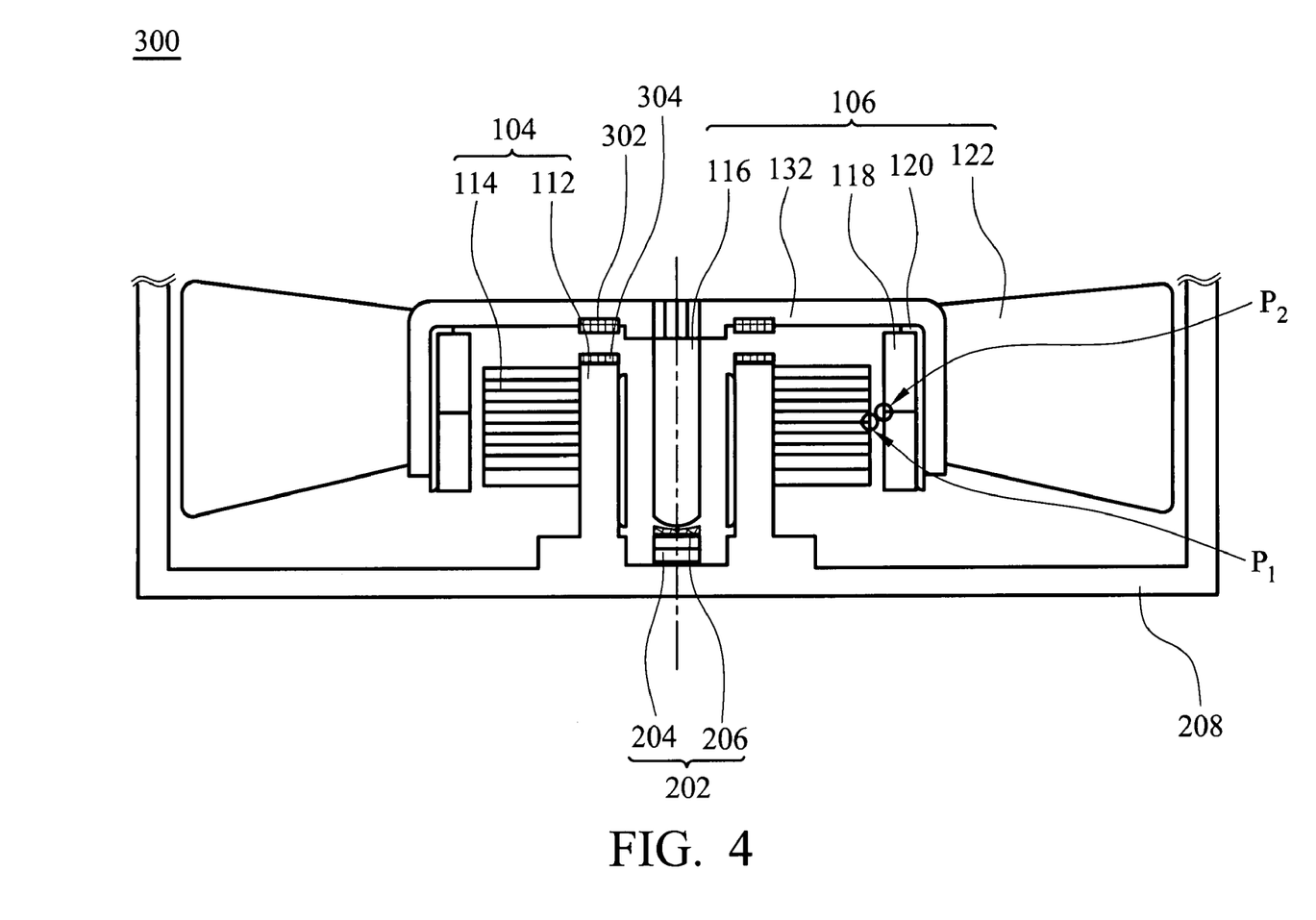
FIG. 4 is a schematic diagram of a motor according to a third embodiment of the present invention.

FIG. 4 is a schematic diagram of a motor 300 according to a third embodiment of the present invention, from which elements common to said embodiments are omitted. The difference is that a magnetic structure 304 is disposed on the top of the stator fixing base 112, and a magnetic structure 302 is formed on the rotor hub 132. The magnetic structures 302 and 304 are attracted to each other without making contact. The magnetic structure 304 does not contact the permeable structure 114 and is positioned higher than the permeable structure 114 in an axial direction. The magnetic structure 302 is a circular, fan-shaped, block-shaped, or rectangular structure. The shape and position of the magnetic structure 302 correspond to those of the magnetic structure 304.

Furthermore, the magnetic structure 304 and the stator fixing base 112 are connected by gluing, fitting, engaging, contacting, or combinations thereof. The magnetic structure 302 and the rotor hub 132 are also connected by gluing, fitting, engaging, contacting, or combinations thereof.

Figure 5:
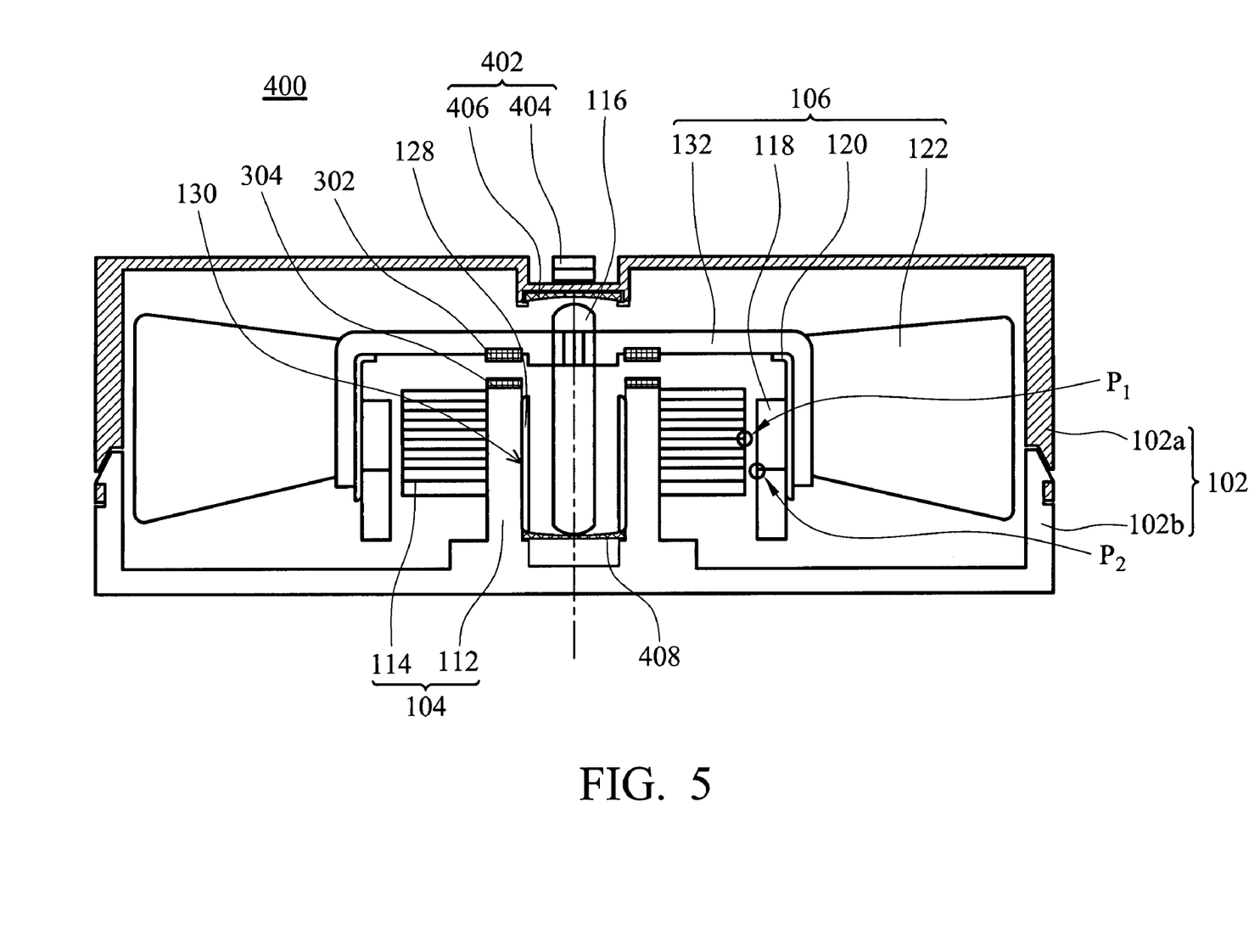
FIG. 5 is a schematic diagram of a motor according to a fourth embodiment of the present invention.

FIG. 5 is a schematic diagram of a motor 400 according to a fourth embodiment of the present invention, from which elements common to said embodiments are omitted. The difference is that there is only one magnetic structure 402 formed on an upper cover 102a of the frame 102. The magnetic central plane P2 of the magnetic structure 118 is lower than the magnetic central plane P1 of the permeable structure 114 in an axial direction. Moreover, a wear-resistant structure 408 is disposed at a lower cover 102b.

In this embodiment, the magnetic structure 402 is entirely made of a magnetic material, or formed by a wear-resistant structure 406 and a magnetic body 404. Moreover, the surface between the magnetic structure 402 and the shaft 116, the surface between the wear-resistant structure 406 and the shaft 116, and/or the surface between the wear-resistant structure 408 and the shaft 116 is a curved surface with a contact point therebetween. The surface shape of the magnetic structure 402 and/or the wear-resistant structures 406, 408 is curved, pointed, concave, convex, or combinations thereof.

The motor described above is applied in an axial flow fan. The present invention, however, is not limited to the disclosed fan. The motor is also applicable in other fans such as frameless, centrifugal, outer-rotor, or inner-rotor fan.

In the above embodiments, the shaft of the rotor has only one point of contact with the stator or no contact therebetween when buoyant airflow force is generated during rotation. Thus, the noise level of the motor is greatly reduced and lifetime is increased.

Furthermore, the motor of the present invention generates buoyant force by magnetic attraction from the shaft during operation such that the shaft does not contact other elements thus reducing noise and increasing the lifetime of the motor.

The motor of the present invention does not require the conventional bearing, thus reducing the number of elements in the motor, thereby minimizing the manufacturing cost.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fan assembly, comprising:
   a stator, disposed at a base of a frame, and having at least one permeable structure with a first magnetic central plane;
   a rotor coupled to the stator and having a shaft, a plurality of blades and at least one first magnetic structure, the shaft extended axially without support of a sleeve, hydrodynamic, ceramic or ball bearings, wherein the first magnetic structure corresponding to the permeable structure comprises a second magnetic central plane; and
   at least one second magnetic structure disposed on the frame for positioning the shaft by magnetic attraction of the at least one second magnetic structure and the shaft;
   wherein the second magnetic central plane is disposed slightly above or below the first magnetic central plane in an axial direction of the shaft, and the second magnetic structure and the shaft are coaxially aligned.

2. The fan assembly as claimed in claim 1, wherein when the second magnetic structure is disposed on the base, the second magnetic central plane is positioned substantially higher than the first magnetic central plane in an axial direction, and when the second magnetic structure is disposed on a top of the frame, the second magnetic central plane is substantially lower than the first magnetic central plane in an axial direction.

3. The fan assembly as claimed in claim 2, wherein the shaft contacts the second magnetic structure at a contact point.

4. The fan assembly as claimed in claim 2, further comprising at least one first wear-resistant structure disposed between the shaft and the second magnetic structure.

5. The fan assembly as claimed in claim 4, wherein the shaft contacts the first wear-resistant structure at a contact point.

6. The fan assembly as claimed in claim 2, further comprising at least one second wear-resistant structure, disposed on the frame, and corresponding to an end of the shaft away from the second magnetic structure, and the shaft contacts the second wear-resistant structure at a contact point.

7. The fan assembly as claimed in claim 2, further comprising an opening defined at the center of the stator and the shaft extended therein, and a protective structure disposed on a sidewall of the opening without contacting the shaft.

8. The fan assembly as claimed in claim 7, wherein the protective structure is selected from the group consisting of plastic, flexible material, vibration absorbing material, and combinations thereof.

9. The fan assembly as claimed in claim 1, wherein an end surface of the shaft has a flat, curved, pointed, concave, or convex shape; and the second magnetic structure has an end portion, facing the end surface of the shaft; when the shaft contacts the second magnetic structure at a contact point, the shape of the end surface of the shaft corresponds to the shape of the end portion of the second magnetic structure.

10. The fan assembly as claimed in claim 4, wherein an end surface of the shaft has a flat, curved, pointed, concave, or convex shape; and the first or the second wear-resistant structure has an end portion, facing the end surface of the shaft; when the shaft contacts either the first or the second wear-resistant structure, the shape of the end surface of the shaft corresponds to the shape of the end portion of the first wear-resistant structure, the second wear-resistant structure, or both.

11. The fan assembly as claimed in claim 1, wherein the second magnetic structure is a permanent magnet, a plastic magnet or an electromagnet.

12. The fan assembly as claimed in claim 1, wherein the frame comprises an upper cover and a lower cover, corresponding to each other, connected by fitting, engaging, gluing, locking or connecting via a cushion device.

13. The fan assembly as claimed in claim 1, wherein the second magnetic structure and the frame are connected by gluing, fitting, engaging or contacting.

14. The fan assembly as claimed in claim 1, further comprising a third magnetic structure disposed on a top of the base of the frame; and a fourth magnetic structure disposed on the rotor; wherein the third and the fourth magnetic structures are attracted to each other without making contact therebetween.

15. The fan assembly as claimed in claim 14, wherein the third magnetic structure is circular, fan-shaped, or block-shaped, and the third magnetic structure and the base are connected by gluing, fitting, engaging or contacting; and the fourth magnetic structure corresponds to the third magnetic structure, and the fourth magnetic structure and the rotor are connected by gluing, fitting, engaging or contacting.

16. A motor comprising:
a stator having a fixing base and at least one permeable structure with a first magnetic central plane;
a rotor coupled to the stator and having a shaft without any sleeve, hydrodynamic, ceramic or ball bearing supports, and at least one first magnetic structure with a second magnetic central plane; and
at least one second magnetic structure disposed under the shaft or on the fixing base for positioning the shaft, wherein the at least one second magnetic structure is disposed under the shaft, and the second magnetic structure and the shaft are coaxially aligned;
wherein the second magnetic central plane is disposed slightly above or below the first magnetic central plane in an axial direction of the shaft.

17. The motor as claimed in claim 16, further comprising at least one first wear-resistant structure disposed between the shaft and the first second magnetic structure.

18. The motor as claimed in claim 17, wherein the shaft contacts the first wear-resistant structure or the second magnetic structure at a contact point.

19. The motor as claimed in claim 16, further comprising a protective structure disposed inside the fixing base.

20. The motor as claimed in claim 19, wherein the protective structure is made of plastic, flexible material or vibration absorbing material.

21. The motor as claimed in claim 16, wherein an end surface of the shaft has a flat, curved, pointed, concave or convex shape; and the second magnetic structure has an end portion with a flat, curved, pointed, concave or convex shape corresponding to that of the end surface of the shaft.

22. The motor as claimed in claim 16, further comprising a frame for receiving the stator and the rotor therein.

23. The motor as claimed in claim 22, wherein the second magnetic structure and the fixing base are connected by gluing, fitting, engaging or contacting.

24. The motor as claimed in claim 22, further comprising at least one second wear-resistant structure disposed on the frame and corresponding to an end of the shaft protruding from a top surface of the rotor.

25. The motor as claimed in claim 24, wherein an end surface of the shaft has a flat, curved, pointed, concave or convex shape and the second wear-resistant structure has an end portion, facing the end surface of the shaft, with a flat, curved, pointed, concave or convex shape corresponding to that of the end surface of the shaft.

26. The motor as claimed in claim 22, wherein the first or second magnetic structure is a permanent magnet, a plastic magnet or an electromagnet.

27. The motor as claimed in claim 16, further comprising a third magnetic structure disposed on the rotor corresponding to the second magnetic structure for generating a magnetic force therebetween when the second magnetic structure is disposed on the fixing base.

28. The motor as claimed in claim 27, further comprising a fourth magnetic structure disposed on the frame and coaxially positioned above the shaft.

29. A motor comprising:
a stator having a fixing base and at least one permeable structure with a first magnetic central plane;
a rotor coupled to the stator and having a shaft without any sleeve, hydrodynamic, ceramic or ball bearing supports, and at least one first magnetic structure with a second magnetic central plane; and
at least one second magnetic structure disposed under the shaft or on the fixing base for positioning the shaft;
wherein the second magnetic central plane is disposed slightly above or below the first magnetic central plane in an axial direction of the shaft;
a third magnetic structure disposed on the rotor corresponding to the second magnetic structure for generating a magnetic force therebetween when the second magnetic structure is disposed on the fixing base;
a fourth magnetic structure disposed on the frame and coaxially positioned above the shaft.

* * * * *